Patented June 27, 1933

1,915,618

UNITED STATES PATENT OFFICE

ANDERSON W. RALSTON AND JAMES R. WRIGHT, OF BATON ROUGE, LOUISIANA, ASSIGNORS TO STANDARD-I. G. COMPANY

METHOD OF REACTIVATING CATALYTIC MATERIALS

No Drawing. Application filed June 2, 1931. Serial No. 541,663.

This invention relates to the preparation of catalytic materials and more particularly comprises a method for removing halogen or halogen compounds from catalytic materials which are used in the hydrogenation of carbonaceous materials under high pressure and at elevated temperature.

In the hydrogenation of carbonaceous materials the oxides, sulfides, selenides, nitrides, carbides and other compounds of metals of the 6th group of the periodic system of elements, such as molybdenum, tungsten, chromium and uranium have been found to be particularly effective for promoting the hydrogenation. While these materials are sulphactive, that is, are not poisoned by or in the presence of sulfur or sulfur-containing compounds, and withstand conditions of high temperature and pressure, we have found that the presence of halogens, and especially chlorine, in the catalysts greatly reduces their hydrogenating activity. The decrease in activity is particularly noticeable with respect to the power to hydrogenate a straight olefinic linkage, the power to hydrogenate a nascent hydrocarbon radical not appearing to be materially affected. This means that while the halogen-containing catalyst is still sufficiently active to cause some hydrogenation and can be used therefore in certain types of reactions, such for example as the hydrogenation in vapor phase of gas oils or similar fractions to form motor fuels of high anti-detonation value, in which a strongly hydrogenating catalyst is not essential, yet these halogen-containing catalysts are decidedly undesirable in other types of hydrogenation, such as, for example, the improvement of lubricating distillates, or the hydrogenation of solid carbonaceous materials or heavy residues or fractions of petroleum, in which a catalyst having strong hydrogenating activity is not only advantageous but often essential to the success of the process. Moreover, the danger of contaminating the catalyst with chlorides is especially acute when hydrogenating the heavier residues or fractions of petroleum, such as topped crudes, cracking coil tars and the like, because many types of natural crudes from which these heavier fractions are obtained contain small quantities of salt or other inorganic and organic chlorides.

We have observed that the clorine usually combines with the active 6th group metal to form oxychlorides. These can be readily detected by a microscopic examination in which the oxychlorides appear as large deliquescent crystals.

We have found that chlorine or other halogen can be removed from hydrogenation catalysts by subjecting the halogen containing catalyst to the action of a gaseous oxide which will react with the halogen to form a volatile halogen compound. As examples of suitable gaseous oxides of this kind may be mentioned carbon monoxide, sulfur dioxide and steam. The treatment with the gaseous oxide may be carried out under atmospheric pressure or under pressures as high as 20, 100, 200, 1000 atmospheres or more and at normal or elevated temperatures, although temperatures between about 400 and 1000° F. are particularly suitable. It is also sometimes advantageous to conduct the treatment with the gaseous oxide in the presence of hydrogen, or mixtures of hydrogen with hydrogen sulfide or hydrogen selenide.

The reactions by which chlorine may be removed can be represented by the following equations showing the use of steam, carbon monoxide and sulfur dioxide as the chlorine removing agent:

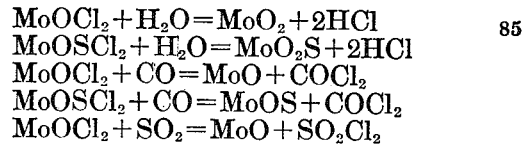

$MoOCl_2 + H_2O = MoO_2 + 2HCl$
$MoOSCl_2 + H_2O = MoO_2S + 2HCl$
$MoOCl_2 + CO = MoO + COCl_2$
$MoOSCl_2 + CO = MoOS + COCl_2$
$MoOCl_2 + SO_2 = MoO + SO_2Cl_2$

The ability of these gaseous oxides to remove chlorine from the catalytic materials can be taken advantage of in a number of different ways; for example, combination of chlorine with the active constituents may be substantially or completely prevented by introducing into the hydrogenation reaction zone, along with the materials to be hydrogenated, small quantities of one or more of these gaseous oxides in order that the chlorine may be continuously eliminated in the form of volatile compounds instead of combining with the catalytic material.

Another way in which this property of the gaseous oxides to remove halogen can be availed of is to prepare the catalyst masses from the chlorides or other halogen compounds of the active ingredients and subsequently to remove the halogen from the prepared catalyst by treatment with the gaseous oxides. It has heretofore not been possible or desirable to use the chlorides of the catalytic elements as raw materials in the preparation of the catalysts because of the harmful effect which chlorine was known to have on the active constituents. In many cases the chlorides or other halogen compounds of the elements used are considerably cheaper and available in greater quantities than the oxides or acid anhydrides, and by preparing the catalyst masses from these compounds a great saving may be effected in the initial cost of the raw materials.

As an example of how chlorine decreases the hydrogenating activity of catalysts containing active metals of the 6th group, especially the activity in respect to the hydrogenation of straight olefin linkages, and to show also how the treatment with gaseous oxides of the type mentioned can substantially restore the hydrogenating activity, a catalyst comprising about 50 parts of molybdenum oxide, 30 parts of zinc oxide and 20 parts of magnesium oxide is activated by treatment with hydrogen for about 40 hours at a temperature of 900° F. and then with hydrogen sulfide for 6 hours. The hydrogenating activity of the catalyst is indicated by the substantially complete conversion of octylene to octane when a mixture of octylene and hydrogen is passed over it at about 572° F.

The active catalyst is then subjected to treatment with hydrogen and allyl chloride over the same temperature range. Large quantities of hydrogen chloride and hydrogen sulfide are given off indicating that the chloride is extremely reactive with the catalyst. After the catalyst is thoroughly chlorided it is again used under the original conditions to hydrogenate octylene to octane. The formation of octane at 572° F. is only about one-fifth of what it was with the original active catalyst. This shows that the activity with respect to hydrogenating straight olefine linkages has been greatly reduced.

The catalyst is now subjected to treatment with steam and hydrogen at a temperature of about 600° F., for a period of six hours. There is a vigorous generation of hydrogen chloride during the early part of the treatment which gradually drops off as the chlorine is removed. The chlorine-free catalyst is treated for six hours more with hydrogen at about 900° F., and then for an additional six hours with hydrogen sulfide.

The reactivated catalyst is then run with octylene and hydrogen under the original conditions and the formation of octane at 572° F. is found to be substantially the same at it was with the original active catalyst, indicating that the hydrogenating activity at this temperature has been completely restored.

The following table presents the results in condensed form:

*Hydrogenation of octylene to octane with molybdenum catalyst*

| Temp. °F. | Original active catalyst % octane | After treatment with allyl chloride % octane | After reactivation with steam % octane |
|---|---|---|---|
| 392 | 56.88 | 4.79 | 15.56 |
| 482 | 63.47 | 5.39 | 52.09 |
| 572 | 93.81 | 22.15 | 95.81 |
| 662 | 58.08 | 20.35 | 89.81 |
| 752 | Cracked. | | 52.10 |

It will be observed that the hydrogenating activity of the original catalyst at 572° F. as indicated by the formation of 93.81% octane is greatly reduced after chloriding as indicated by the formation of only 22.15% octane at 572° F., and that the original activity is then completely restored after treatment with steam as indicated by the formation of 95.81% octane at 572° F.

Carbon monoxide or sulfur dioxide may be used in place of the steam with equally satisfactory results.

This invention is not limited by any theory of the mechanism of the poisoning of catalysts by chlorine, nor by any data given for purposes of illustration, but is limited only by the following claims in which we wish to claim all novelty inherent in the invention.

We claim:

1. Method for restoring the hydrogenating activity of sulphactive catalysts which have been contaminated with halogen, which comprises subjecting the halogen-containing catalyst to the action of a gaseous oxide which reacts with the halogen to form a volatile halogen compound and removing the mixture of gas and the volatile chlorine compound.

2. Method for removing chlorine from hydrogenation catalysts comprising the oxides or sulfides of metals of the 6th group of the periodic system of elements, which comprises subjecting the chlorine-containing catalyst mass to the action of a gaseous oxide which reacts with the chlorine to form a volatile chlorine compound and removing the mixture of gas and volatile chlorine compound.

3. Method according to claim 2 in which the catalyst is subjected to the action of a gaseous oxide at a temperature between about 500 and 1000° F.

4. Method according to claim 2 in which the catalyst is subjected to the action of the gaseous oxide in the presence of free hydrogen.

5. Method according to claim 2 in which steam is the gaseous oxide used.

6. Method according to claim 2 in which carbon monoxide is the gaseous oxide used.

7. Method according to claim 2 in which sulfur dioxide is the gaseous oxide used.

8. In a process for hydrogenating carbonaceous material which contains chlorine compounds under high pressure and at elevated temperatures and in the presence of the oxides or sulfides of metals of the 6th group of the periodic system, the method of preventing poisoning of the catalytic materials by chlorine which comprises continuously introducing into the hydrogenation reaction zone a gaseous oxide which reacts with the chlorine under conditions to form a volatile chlorine compound.

9. An improved process for the reactivation of a catalytic mass for hydrogenation of carbonaceous materials, which comprises passing steam at an elevated temperature and for a prolonged period, over a mixture of two substances one of which is a compound of a metal of the sixth group of the periodic system, and the other a compound selected from the compounds of magnesium and zinc, such materials being contaminated with chlorine-containing compounds, whereby chlorine is removed in the volatile form.

ANDERSON W. RALSTON.
JAMES R. WRIGHT.